May 9, 1939.  C. BARRIE  2,157,276
CUP AND SAUCER BASKET FOR COLLECTIVE DISHWASHING
Filed Nov. 16, 1937
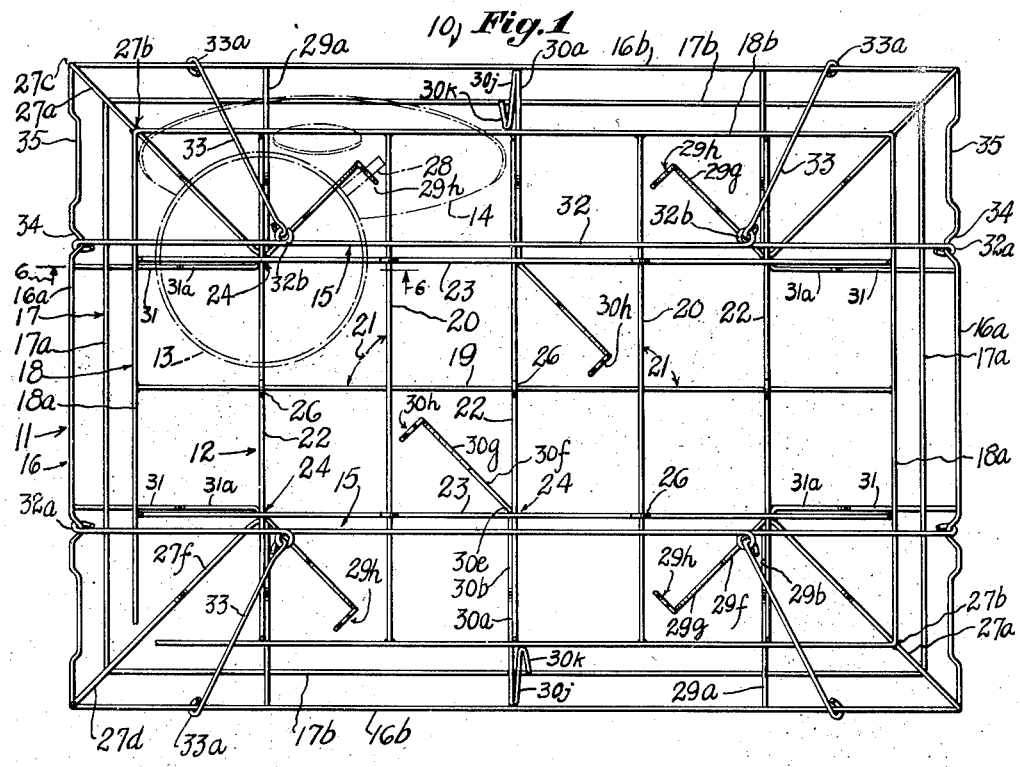
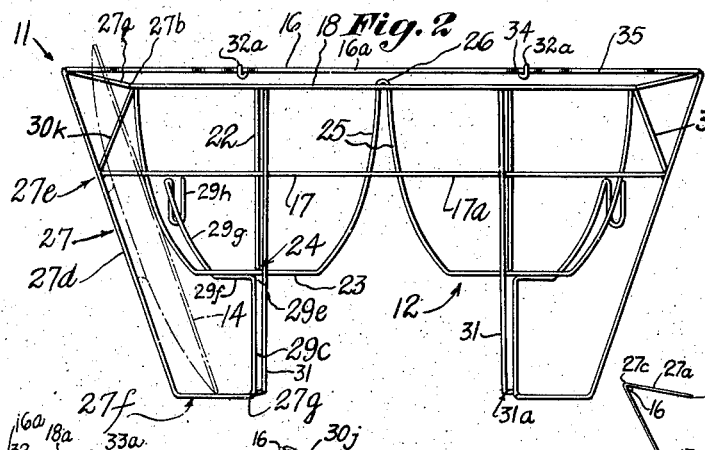
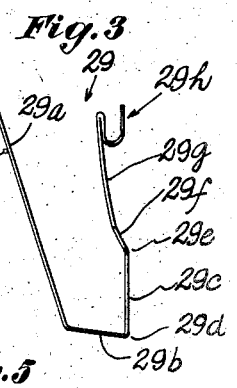
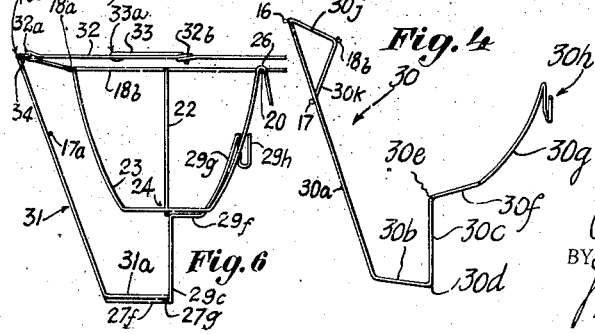
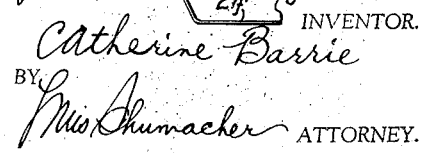
INVENTOR.
Catherine Barrie
BY
Mies Shumacher ATTORNEY.

Patented May 9, 1939

2,157,276

UNITED STATES PATENT OFFICE 2,157,276

CUP AND SAUCER BASKET FOR COLLECTIVE DISHWASHING

Catherine Barrie, Cold Spring Harbor, N. Y.

Application November 16, 1937, Serial No. 174,794

4 Claims. (Cl. 141—9)

This invention relates to devices for the collective washing of dishes.

One object of this invention is to furnish a device of this character which can be used for the manual collective washing of dishes, and desidably also, for the storing of the dishes as washed.

More particularly, the invention aims to provide an appliance for receiving dishes, such as cups and saucers, in spaced nonbreaking relationship. This appliance may be brought to the dinner table for the removal of the dishes into the kitchen by disposing the dishes in the appliance. When the dishes are placed therein, the appliance is closed in such a manner as to securely hold the dishes from breakage, even if the appliance is inverted. The appliance may now be brought to the kitchen, placed in the sink, and the dishes thoroughly flushed with hot water through the openings in the walls and partitions of the appliance. By using a wire structure, these openings may be so large that a mop may be readily inserted where required for additionally cleaning the dishes. Now the dishes may be inverted by inverting the appliance and the water permitted to drain therefrom. Due to the use of hot water and the free circulation of air about the dishes, the latter will rapidly dry. The appliance, with the dishes as originally placed therein, may now be stored away. When the dishes are again to be used, the appliance may desirably be brought to a table, opened up, and the dishes removed and placed directly on the table. This completes a cycle, in which a minimum of handling of the dishes is attained.

It is therefore an object of the invention to provide improved means for the accomplishment of the results and advantages above stated.

Another object of the invention is to provide a device of the nature set forth having improved means comprising few and simple parts, which are inexpensive to manufacture and assemble, and which cooperate in a unitary structure that is neat, compact, free of projecting parts, and convenient in operation as well as durable, reliable, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a plan view of a device embodying the invention, with the device being in closed position, certain parts being removed, and certain dishes shown therein in dot-dash lines.

Fig. 2 is a view in end elevation thereof with a dish shown in dot-dash lines.

Figs. 3, 4, and 5 are perspective views of certain elements which form permanent parts of the device.

Fig. 6 is a sectional view taken on the line 6—6 of Fig. 1.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a foraminous or perforate device embodying the invention. The same may desirably consist of wire or other elongated elements to provide easy visibility and ample accessibility of a mop through the resulting openings to assure proper cleaning of the dishes. Thus the device may include a wire basket 11 having a dish supporting frame 12, the latter desirably arranged to hold dishes in properly spaced relation to each other, and preferably cooperating with the container walls to compactly hold other dishes, in a secure manner, all as hereinafter in detail described. For example, a cup is shown at 13, and a saucer at 14, but these articles or shapes are intended to be generally illustrative of one particular embodiment of the invention. Cooperating with the container 11 and frame 12 is a closure means 15 which is adapted to overlie articles such as 13, 14, to cause the same to be securely retained when the device 10 is inverted. It will be understood that the parts 11, 12 and 15 may be of various shapes and structures, and variously combined within the scope of the objects and purposes of the invention.

More specifically, the container or basket 11 may be generally rectangular shape with its sides and ends downwardly converging. The structure of the basket, and, in fact, the device as a whole, may be best understood by considering it as being longitudinally divided along a vertical plane. In other words, one side portion of the device 10 is a duplicate of the other side portion thereof.

The basket as a whole may consist of a top marginal rectangular wire element 16 having opposite end portions 16a and opposite side portions 16b. Spaced below the wire 16 is a second rectangular wire 17 of smaller size providing end portions 17a and side portions 17b. Above the wire 17 and slightly below the wire 16 is a third rectangular wire 18 having end portions 18a and side portions 18b. In the plane of the wire 18, are wires 19, 20, the wire 19 centrally connecting the end portions 18a; and the wires 20 connecting the side portions 18b at spaced points. Thus six cup receiving openings 21 are provided. Supporting bottoms for the six cups may be provided by three spaced cross wires 22 and two longitudinal spaced wires 23, these wires intersecting as at 24 in alinement with the centers of the openings 21. The wires 22, 23 are formed to fit the contour of the cups, being of undulating form to provide side portions 25 as shown in Fig. 2. The wires 22 are connected at their ends to the portions 18b and are looped over the wire 19 as at 26. Similarly, the wires 23 are connected at their ends to the portions 18a and are looped over the cross wires 20 as at 26.

Thus the frame 12 may be considered as consisting of the wires 18, 19, 20, 22 and 23.

In order to secure the frame 12 in the basket 11, as well as to complete the latter, corner wires 27 are provided for the basket, as shown in Fig. 5, and being disposed diagonally of the basket. For example, each wire 27 may have a top portion 27a secured at its free end as at 27b to the adjacent corner of the wire 18, and being bent downwardly at 27c to form an upright 27d. The latter may be secured at 27e to the wire 17, see Fig. 2, and at its lower end may be inwardly bent to provide a horizontal diagonal base portion 27f which terminates at a point in axial alinement with the center 24 of a cup holder 21.

In order to prevent rotary movement of the cups and possible breakage of the handles 28 thereof, I may provide wires 29, 30, shown respectively in Figs. 3 and 4. The wires 29 are near the corners of the basket, and the wires 30 are at opposite central parts of the basket. The wires include the respective inclined portions 29a and 30a which interconnect the wires 16, 17, with particular reference to the parts 16b and 17b thereof. The wires 29 and 30 have inwardly bent base portions 29b, 30b respectively, from which upwardly extend the vertical parts 29c and 30c respectively in central alinement with the cup holders 21. At points 29d and 30d, the wires 29, 30 are secured to the wires 27 at the free ends 27g thereof. At the points 29e and 30e, the wires 29, 30 are secured to the wires 22, 23 at their intersections 24. From the points 29e, 30e, the respective wires 29, 30 have angularly extending horizontal portions 29f, 30f leading to upwardly curved cup fitting sections 29g, 30g, which terminate in loops 29h, 30h that open upwardly to receive the cup handles 28 as shown in Fig. 1. It will be noted that the wires 29, 30 are alike, except that in one case the part 29f is bent back at an acute angle, and in the other the part 30f extends at an obtuse angle relative to the plane of the parts 30a, 30b. This causes an angular offset arrangement of the cup handles, so that the latter cannot strike each other nor the plates 14.

It will be noted that the base portions 29b form supports for the plates 14, as the latter are inserted within a section defined by the wires 16, 17, 18, and by wires 22 and the parts 29a, 30a. In order to space the side saucers from each other, the wire elements 30 may each have portions extending from the upper end of the section 30a, including a portion 30j which is connected to an adjacent wire element 18b. From the portion 30j, extends a part 30k in reverse relation to connect at its end with the section 30a adjacent to a wire element 17. The parts 30j and 30k lie in the vertical plane of the wire 30a in actual practice, but have been offset as shown in Fig. 1, merely for clarity in the drawing. Thus the parts 30j, 30k afford a reenforcement for the basket and serve as a partitioning means. To afford base supports for plates 14 at the ends of the basket, angle shaped wires 31 may be disposed at the ends of the basket and with one arm secured to the wires 16a and 17a, and the other arm 31a secured at its end to companion wires at 27g as shown in Fig. 6.

The closure means 15 may comprise separate closure means for each side of the basket, each being regarded as a unitary closure means. Such closure means 15 may comprise a longitudinal wire 32 having end loops 32a and a pair of intermediate loops 32b. The former are permanently slidably engaged around the end wires 16a, and the latter afford pivotal connection with corresponding loops of slidable closure wires 33, whose remote free ends are looped at 33a around the side wires 16b. The end wires 16 may be inwardly notched as at 34 for releasably retaining the loops 32a. Adjoining the notches 34 are the recessed parts 35 along which the loops 32a are movable. If the wires 32 are bodily pushed toward a side, the loops 32a will spring from the notches into the recesses 35 so that the wire 32 may be moved to lie intermediate of the rows of cups and saucers, and substantially over a wire 17b. Due to the angle of the wires 33, the latter will be simultaneously swung apart along the wire 17b so that the loops 33a will lie substantially at the corners of the wire 16, thus clearing the spaces for removal of the saucers. Hence both cups and saucers may be readily removed when the closure means 15 is open. To move the same to closed position, the wires 32 are moved inward, with the loops 32a snapping out of the stop recesses 35 and into the locking notches 34, the wires 33 following to the positions shown, so that the wires 32 generally centrally overlie the cups, and the wires 33 overlie the saucers. Hence the basket can be inverted without loss or breakage of any articles. It will be understood that the wires have sufficient resilience for the described action, and sufficient stiffness for rigidity of the basket.

The closure means 15 is spaced slightly above the cup holders for clearance, and closely overlies the cups and saucers to reliably retain the same.

It will now be seen that the device may be used to receive six cups and six saucers, the latter disposed two at each side edge to edge, and one at each end, for the collective washing and storing of dishes as herein set forth. It will be noted that a mop may be freely used so that the operator need not insert her hands in any dish water.

It will be understood that the wires may be interconnected in any suitable manner, as by soldering, welding or the like.

I claim:

1. A device including foraminous means for the collective washing and storing of cup and saucer elements, comprising a container having a top opening, a frame secured in the container providing upward opening pocket portions for retaining cup elements in spaced relation to each other, said frame being spaced from certain of the container walls to provide a chamber for receiving saucers disposed along generally upright planes, means partitioning said chamber to maintain the saucer elements in spaced relation to each other, the pocket portions having means for receiving and holding the cup handles to prevent rotation of the cup elements, the cup handle holding means being disposed in spaced relation to the saucer chamber, and unitary openable closure means for said pockets and said chamber.

2. A device including foraminous means for the collective washing and draining of cups, including a container open at the top and having different means therein for supporting and holding cups and saucers in separate rows side by side and with the saucers in upright planes, and closure means for the container including a first closure member slidably mounted on the container and movable over a cup holding means to close the same, and movable into an open position intermediate of the cup and saucer holding means, and other closure members movably mounted on the container and pivotally connected to the first closure member for movement thereby so as to closingly overlie the saucer holding portion and so as to be movable into open position alongside of the saucer holding portion, whereby the cups and saucers can be removed without obstruction by the closure means by movement of the first closure member into said intermediate position.

3. A device including foraminous means for the collective washing and storing of cup and saucer elements, comprising a container having a top opening and having a frame portion providing upward opening pocket portions for retaining cup elements in spaced relation to each other, the frame portion being spaced from certain of the container walls to provide a chamber for receiving saucers disposed along generally upright planes, means partitioning said chamber to maintain the saucer elements in spaced relation to each other, and said frame portion having hooks for engaging the handles of cup elements engaged by the pocket portions to prevent rotation of the cup elements and to maintain the handles in spaced relation to each other and to the saucer elements, and unitary openable closure means for said pocket portions and said chamber.

4. A device including foraminous means for the collective washing and storing of cup and saucer elements, comprising a container having a top opening and having a frame portion providing upward opening pocket portions for retaining cup elements in spaced relation to each other, the frame portion being spaced from certain of the container walls to provide a chamber for receiving saucers disposed along generally upright planes, means partitioning said chamber to maintain the saucer elements in spaced relation to each other, and said frame portion having hooks for engaging the handles of cup elements engaged by the pocket portions to prevent rotation of the cup elements and to maintain the handles in spaced relation to each other and to the saucer elements, and unitary openable closure means comprising a first means for closing said chamber and a second means for closing said pocket portions, said closure means in open position being movable so that the first means clears the chamber and the second means lies along a plane intermediate of the chamber and the pocket portions.

CATHERINE BARRIE.